United States Patent
Rong et al.

(10) Patent No.: US 11,634,564 B2
(45) Date of Patent: Apr. 25, 2023

(54) HIGH HEAT AND OIL RESISTANT CONVEYOR BELT

(71) Applicant: ContiTech Transportbandsysteme GmbH, Hannover (DE)

(72) Inventors: Guangzhuo Rong, Hudson, OH (US); Thomas George Burrowes, North Canton, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 198 days.

(21) Appl. No.: 17/207,785

(22) Filed: Mar. 22, 2021

(65) Prior Publication Data
US 2022/0298337 A1    Sep. 22, 2022

(51) Int. Cl.
*C08L 19/00* (2006.01)
*B32B 1/00* (2006.01)
(Continued)

(52) U.S. Cl.
CPC .............. *C08L 19/006* (2013.01); *B32B 1/00* (2013.01); *B32B 25/042* (2013.01); *B65G 15/34* (2013.01);
(Continued)

(58) Field of Classification Search
CPC ......... C08L 19/006; B65G 15/34; B32B 1/00; B32B 25/042; B32B 2307/732;
(Continued)

(56) References Cited

U.S. PATENT DOCUMENTS

| 4,774,288 A | 9/1988 | Ridland |
| 4,842,024 A | 6/1989 | Palinchak |

(Continued)

FOREIGN PATENT DOCUMENTS

| AU | 2013258262 A1 | 12/2014 |
| CN | 200957970 Y | 10/2007 |

(Continued)

OTHER PUBLICATIONS

International Search Report and Written Opinion dated Jul. 11, 2022 of International Application PCT/EP2022/057376 on which this application is based.

(Continued)

*Primary Examiner* — James R Bidwell

(57) ABSTRACT

Conveyor belts having a reinforcement layer, a carry cover layer above the reinforcement layer, and a pulley cover layer disposed beneath the reinforcement layer, where the carry cover layer includes least one hydrogenated nitrile butadiene rubber (HNBR) material. The HNBR material(s) may have a percentage of hydrogenation of from about 90% to about 96%, from about 92% to about 95%, or even about 94%. The carry cover layer may be from about 4 mm to about 6 mm thick, or even from about 4 mm to about 5 mm thick. In some cases, the reinforcement layer includes a rubber matrix, which may be formed of a nitrile rubber (NBR), or mixture of nitrile NBR and natural rubber blended in a NBR:NR weight ratio of from 3:1 to 9:1. In some aspects, the reinforcement layer includes a plurality of reinforcement plies embedded in the rubber matrix.

19 Claims, 1 Drawing Sheet

(51) Int. Cl.
  *B32B 25/04* (2006.01)
  *B65G 15/34* (2006.01)
(52) U.S. Cl.
  CPC ... *B32B 2260/021* (2013.01); *B32B 2260/048* (2013.01); *B32B 2307/54* (2013.01); *B32B 2307/732* (2013.01); *B32B 2413/00* (2013.01)
(58) Field of Classification Search
  CPC ........ B32B 2260/021; B32B 2260/048; B32B 2307/54; B32B 2413/00
  USPC ........................................................ 198/847
  See application file for complete search history.

(56) References Cited

U.S. PATENT DOCUMENTS

| | | | |
|---|---|---|---|
| 5,362,530 A | 11/1994 | Kitami et al. | |
| 5,938,007 A * | 8/1999 | Fujihiro | D21F 1/0036 |
| | | | 428/421 |
| 6,213,156 B1 | 4/2001 | Niki et al. | |
| 6,237,641 B1 | 5/2001 | Niki et al. | |
| 7,338,574 B2 | 3/2008 | Spohn et al. | |
| 7,478,654 B2 | 1/2009 | Haines | |
| 9,962,906 B1 * | 5/2018 | Maguire | B32B 5/024 |
| 10,364,100 B2 | 7/2019 | Maguire et al. | |
| 10,442,918 B2 | 10/2019 | Inoue et al. | |
| 10,968,041 B1 * | 4/2021 | Rong | B65G 15/34 |
| 2002/0036129 A1 | 3/2002 | Breed et al. | |
| 2004/0040609 A1 | 3/2004 | Oishi et al. | |
| 2007/0048475 A1 | 3/2007 | Haines | |
| 2008/0139709 A1 | 6/2008 | Piccirilli et al. | |
| 2010/0300571 A1 | 12/2010 | Miller et al. | |
| 2011/0155359 A1 | 6/2011 | Doshi | |
| 2011/0226375 A1 | 9/2011 | Harris et al. | |
| 2012/0090720 A1 | 4/2012 | Burrowes et al. | |
| 2012/0168285 A1 | 7/2012 | Holland et al. | |
| 2012/0268285 A1 | 10/2012 | Hansen | |
| 2014/0116562 A1 | 5/2014 | Haines et al. | |
| 2015/0075665 A1 | 3/2015 | Henry | |
| 2015/0291359 A1 * | 10/2015 | Tajima | B65G 15/34 |
| | | | 198/689.1 |
| 2017/0350541 A1 | 12/2017 | Henry | |
| 2018/0045343 A1 | 2/2018 | Burrowes et al. | |
| 2018/0313489 A1 | 11/2018 | D'hondt | |
| 2019/0291958 A1 | 9/2019 | Henning et al. | |
| 2020/0079001 A1 | 3/2020 | Haines | |
| 2020/0080668 A1 | 3/2020 | Haines et al. | |
| 2022/0213989 A1 | 7/2022 | Hou | |

FOREIGN PATENT DOCUMENTS

| | | |
|---|---|---|
| EP | 0719718 A2 | 7/1996 |
| EP | 1721842 A1 | 11/2006 |
| EP | 3543177 A1 | 9/2019 |
| JP | 2006062141 A | 3/2006 |
| WO | 2010026474 A1 | 3/2010 |

OTHER PUBLICATIONS

International Search Report and Written Opinion dated Oct. 11, 2021 of International Application PCT/EP2021/071286 which this application is related.

* cited by examiner

HIGH HEAT AND OIL RESISTANT CONVEYOR BELT

FIELD

The field to which the disclosure generally relates is conveyor belts having enhanced resistance to oil-exuding materials at high temperatures. More specifically this disclosure relates to conveyor belts for the transportation of hot materials, such as asphalt, oils, tar or bitumen, at high temperatures.

BACKGROUND

This section provides background information to facilitate a better understanding of the various aspects of the disclosure. It should be understood that the statements in this section of this document are to be read in this light, and not as admissions of prior art.

Conveyor belts are commonly utilized in a wide variety of commercial applications for the purpose of transporting products and materials. Such conveyor belts can serve in applications which have minimal demands, moderate demands, or in applications which are extremely demanding and which require special conveyor belts for carrying loads under adverse conditions, such as exposure to high temperatures.

In some high temperature demanding applications, conveyor belts are used to transfer high temperature petroleum-based materials such as tar, asphalt, bitumen of hot oils, and thus, the conveyor belt cover layers in such applications need to have high heat and oil resistance. Currently, the standard cover compounds used in the industry is based on 100 percent nitrile rubber. Additionally, current NBR based belt covers may also be deficient in heat resistance.

Accordingly, there is a long felt need for conveyor belts which can be repeatedly, or even continuously, exposed to high temperatures while providing a longer service life without compromising the strength, oil resistance, or reliability of the belt. Accomplishing these objectives has proven to be elusive and there continues to be a need for such a high temperature resistant conveyor belt which can withstand temperatures of greater than 100° C. or even 200° C. The need for such a high temperature resistant conveyor belt which can be manufactured in a commercially viable and cost effective manner remains today.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some aspects of the disclosure are conveyor belts having a reinforcement layer, a carry cover layer above the reinforcement layer, and a pulley cover layer beneath the reinforcement layer, where the carry cover layer includes least one hydrogenated nitrile butadiene rubber (HNBR) material. The HNBR material(s) may have a percentage of hydrogenation of from about 90% to about 96%, from about 92% to about 95%, or even about 94%. The carry cover layer may be from about 4 mm to about 6 mm thick, or even from about 4 mm to about 5 mm thick.

In some aspects, the reinforcement layer includes a reinforcement rubber matrix, which may be formed of a nitrile rubber (NBR), or mixture of nitrile NBR and natural rubber blended in a NBR:NR weight ratio of from 3:1 to 9:1. In some cases, the reinforcement layer includes a plurality of reinforcement plies embedded in the reinforcement rubber matrix, and in some cases, three reinforcement plies embedded in the reinforcement rubber matrix. Alternatively, the reinforcement layer may include a plurality of steel cables embedded in the reinforcement rubber matrix.

According to another aspect of the disclosure, a conveyor belt includes a reinforcement layer, a carry cover layer above the reinforcement layer, and a pulley cover layer beneath the reinforcement layer. The carry cover layer comprises a HNBR material having a percentage of hydrogenation of from 92% to 95%. The reinforcement layer includes nitrile rubber (NBR) blended with natural rubber and a plurality of reinforcement plies embedded in the nitrile rubber (NBR) blended with natural rubber. The conveyor belt transports materials having a temperature in excess of 150° C. and containing oily residue. In some cases, the nitrile rubber (NBR) and natural rubber are blended in a NBR:NR weight ratio of from 3:1 to 9:1, or even from 5:1 to 9:1.

Conveyor belt embodiments according to the disclosure may have a carry cover layer with an original tensile strength value of greater than 3000 psi, and/or an oven aged (after 168 hours @ 302 deg F.) tensile strength value of greater than 2600 psi. Also, the carry cover layer may have a fluid immersion volume % swelling of less than 11.0% after immersion IRM903 oil for 168 hours at a temperature of 302 deg F. Further, the carry cover layer may have an oven aged (after 168 hours @ 302 deg F.) Shore A hardness of less than 90.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
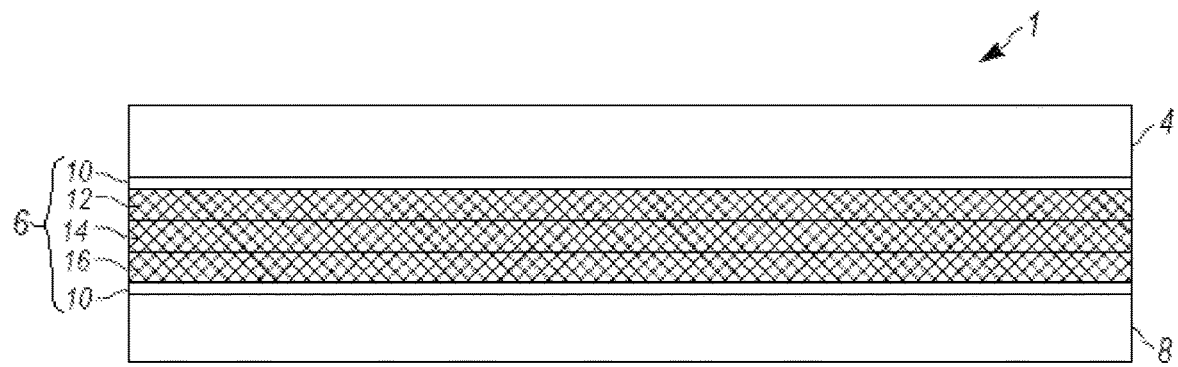
FIG. 1 is a schematic cross-sectional view of a first conveyor belt embodiment 1 of the disclosure which includes HNBR material the carry cover layer 4 of the conveyor belt.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some aspects of the disclosure are high temperature and/or hot oil resistant conveyor belts which provide suitable usability at high temperatures. These conveyor belts can be repeatedly exposed to temperatures of greater than 100° C. or even 200° C. without compromising the strength or reliability of the belt while providing a greatly extended service life. In one application, the conveyance of hot asphalt, the hot mix asphalt is often manufactured at temperatures between about 125° C. and about 175° C., at temperatures between about 130° C. and about 165° C., or even at temperatures between about 135° C. and about 160° C., and then delivered to a transportation vehicle trailer having a conveyor belt therein. Such conveyor belts can also be manufactured in a commercially viable and cost effective manner which makes them an attractive improvement over the conventional conveyor belts being used in high temperature applications today.

In some embodiments, conveyor belts include at least a reinforcement layer, an upper carry cover layer above the reinforcement layer, and a pulley cover layer beneath the reinforcement layer. The carry cover layer contains hydrogenated nitrile butadiene rubber (HNBR), an HNBR containing polymer blend, or a copolymer thereof. In some conveyor belt embodiments, the carry cover layer includes an outer surface layer which contains the hydrogenated nitrile butadiene rubber (HNBR), the HNBR containing polymer blend, or the copolymer thereof, and an inner layer containing a nitrile rubber (NBR), or NBR blended with another suitable material, such as natural rubber and/or synthetic rubber. The outer surface layer will typically be from about 1 mm to about 7 mm in thickness, or even from about 3 mm to about 5 mm in thickness. In some other conveyor belt embodiments, the carry cover layer is one layer which contains the hydrogenated nitrile butadiene rubber (HNBR), the HNBR containing polymer blend, or the copolymer thereof. Collectively, the hydrogenated nitrile butadiene rubber (HNBR), the HNBR containing polymer blend, and the copolymer thereof, are herein referred to as HNBR material(s).

Hydrogenated nitrile butadiene rubber (HNBR) is a synthetic polymer that is obtained by saturating the double bonds in nitrile's butadiene segments with hydrogen, and it is also referred to as HSN (Highly Saturated Nitrile). This special hydrogenation process reduces the number of carbon atom to carbon atom double bonds in the main chains of the NBR. It has been found that such HNBR provides the improved heat resistance and improved oil resistance properties for the embodiments according to this disclosure.

The hydrogenated nitrile butadiene rubber (HNBR) may be classified by the degree of saturation, or the hydrogenation level (HYD). The degree of saturation is the percentage of hydrogenation of all bonds in the main chains of the NBR forming the HNBR. Suitable HNBR materials according to the disclosure have a percentage of hydrogenation of from about 90% to about 96%, from about 92% to about 95%, or even about 94%.

Now referencing FIG. 1 illustrating a conveyor belt 1 which includes a carry cover layer 4 which contains HNBR material in accordance with some aspects of the disclosure. This conveyor belt 1 includes the carry cover layer 4, a reinforcement layer 6, and pulley cover layer 8. The carry cover layer 4 is positioned above the reinforcement layer 6 (which can be constructed of a single ply or multiple plies) with the pulley cover layer 8 being positioned below the reinforcement layer 4. In this fundamental design the reinforcement layer 6 is accordingly situated between the carry cover layer 4 and the pulley cover layer 8.

In the embodiment shown in FIG. 1, the reinforcement layer 6 includes up to three reinforcement plies 12, 14 and 16. While three reinforcement plies are depicted, it is within the scope of the disclosure that any suitable number of plies may be used, for example, but not limited to, two or more, four or less, or even six or less. In the embodiment shown, the three reinforcement plies 12, 14 and 16 are included within a rubber matrix 10 which may be any suitable rubber material, and some nonlimiting examples are given below. Conceptually, reinforcement plies 12, 14 and 16 may also be considered embedded in rubber matrix 10.

The rubber matrix 10 penetrates into the interstitial spaces of the reinforcement plies 12, 14 and 16. The rubber matrix 10 typically extends over and under the reinforcement plies 12, 14 and 16, which promotes good adhesive bonding of reinforcement layer 6 with carry cover layer 4 and pulley cover layer 8. Such an arrangement may also be referred to as a "skim coat".

Figure 3:
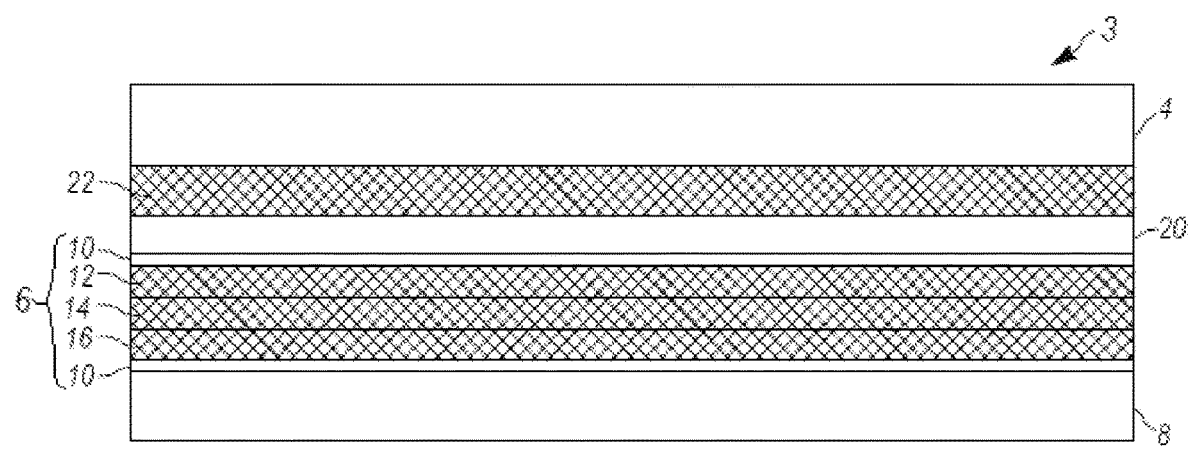

The reinforcement layer 6 and pulley cover layer 8 may be manufactured using materials and methods well known in the art. The reinforcement layer may include steel cables or utilize fabric or polymer reinforcement components, or any combinations thereof. Also, the reinforcement layer is more typically constructed of one or more plies of a polymeric fiber as depicted in FIG. 1 and FIG. 3. More specifically, in FIG. 1 and FIG. 3, the reinforcement layer 6 is illustrated as having three plies of fabric reinforcement 12, 14 and 16. The fabric can optionally be formed of materials such as aramid, polyester, or nylon, or any suitable mixture thereof. In such a scenario polyester or nylon may typically be used for economic reasons. For example, polyethylene terephthalate (PET) or polyethylene naphthalate (PEN) can also advantageously be used with polyethylene terephthalate. The nylon fabrics that can be used in some reinforcement layers of conveyor belts of the disclosure may be comprised of virtually any type of nylon, such as nylon-6,6, nylon-6,12, nylon-6,10, nylon-6,9, nylon-6, nylon-11, or nylon-12. For commercial reasons, the nylon may typically be nylon-6,6 or nylon-6.

Figure 2:
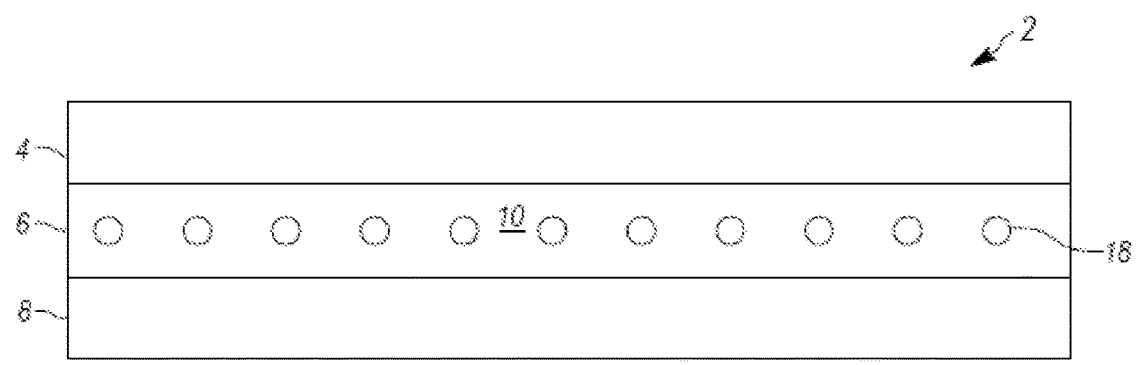
FIG. 2 is a schematic cross-sectional view of a second conveyor belt embodiment 2 of the disclosure which includes HNBR material the carry cover layer 4 of the conveyor belt; and, FIG. 3 is a schematic cross-sectional view of a third conveyor belt embodiment 3 of the disclosure which includes HNBR material the carry cover layer 4 and which further includes a thermal insulation (heat control) layer 20 and optional basalt layer 22.

The reinforcement layer 6 may, according to some embodiments, utilize a plurality of steel cables 18 to reinforce the conveyor belt and to provide it with strength and durability, as depicted in FIG. 2. In FIG. 2, conveyor belt 2 is depicted with steel cables 18 (eleven shown) included within rubber matrix 10. While eleven steel cables 18 are shown, any suitable number of steel cables may be included in reinforcement layer 6.

The pulley cover layer 8 can also be manufactured using materials and methods well known in the art and may include additional strengthening members within the layer. The pulley cover layer 8 will normally be comprised of a rubbery polymer, such as natural rubber, synthetic polyisoprene rubber, styrene-butadiene rubber, polybutadiene rubber, ethylene-propylene-diene monomer rubber, ethylene-propylene rubber, or a blend of two or more of these rubbery polymers. The pulley cover layer of the conveyor belts may be from about 1 mm to about 4 mm, or even from about 1.2 mm to about 2.5 mm in thickness.

Any suitable curing agents may be used in the different layers of conveyor belts according to the disclosure. Non-limiting examples of such curing agents include sulfur based curing agents, peroxide based curing agents, and the like.

With reference to FIG. 1 through FIG. 3, the carry cover layer 4 includes HNBR material(s) and reinforcement layer 6 includes a rubber matrix 10 which may, according to some embodiments, be a nitrile rubber (NBR), or NBR blended with another suitable material, such as natural rubber. When mixed with natural rubber, the NBR may be blended with the natural rubber (NR) in any suitable ratio, such as any NBR:NR weight ratio value within the range of from about 9:1 to 1:9, from 9:1 to 1:1, from 9:1 to 2:1, from 9:1 to 3:1, or even from 9:1 to 4:1.

In another aspect of the disclosure, as illustrated in FIG. 3, the conveyor belt 3 includes a thermal insulation layer 20 and an optional basalt fiber layer 22, to provide an even higher level of resistance to high temperatures. In this aspect, the carry cover layer 4 includes the HNBR material and a reinforcement layer 6 which includes fabric reinforcement plies 12, 14 and 16, as well as rubber matrix 10, which may be formed of NBR or NBR/NR blend. An optional basalt fiber layer 22 (or other like layer) is situated beneath the cover carry layer 4 and above a thermal insulation layer 20. The basalt fiber is an extremely fine fiber which is comprised of plagioclase, pyroxene, and olivine.

The thermal insulation layer 20 may be comprised of any suitable rubbery polymer composition which has a low level of thermal conductivity with the reinforcement layer 6. In some aspects of the disclosure, the thermal insulation layer 20 can be comprised of rubber containing glass, aramid, or carbon fibers and optionally an inorganic or organic flame retardant, such as a chlorinated hydrocarbon. The glass, aramid, polyamide, or carbon fibers used in such thermal insulation layers are typically chopped fibers which are from 0.1 mm to 0.5 mm long and preferably from 0.2 mm to 0.4 mm in length. The rubber in the thermal insulation layer 20 may also optionally include ammonium sulfate, antimony oxide and/or hydrated alumina. In still another aspect of the disclosure, the thermal insulation layer 20 may include a rubber which contains glass, aramid, polyamide, or carbon fibers.

EXAMPLES

The following experimental data was generated for the purpose of further illustrating the nature of some of the embodiments and aspects of the disclosure, and are not intended as a limitation on the scope thereof. The following examples were prepared to illustrate improved belt properties in accordance with some aspects of the disclosure.

In the following examples, in a first pass, a non-productive blend of components was mixed in an internal mixer as indicated in the tables. The non-productive batch was dropped at a temperature of from about 280 deg F. to about 300 deg F. Thereafter, in a second pass, additional components were added to non-productive blend to form a product blend by mixing in an internal mixer. The productive batch was dropped at a temperature of from about 210 deg F. to about 230 deg F. Ingredients used for these examples, comparative example 1 (comp. ex. 1), as well as example 2, are provided in table 1. All values provided in table 1 are presented in phr (per hundred rubber) amounts.

TABLE 1

| Ingredient | Comparative Example | Ex. 1 | Ex. 2 |
| --- | --- | --- | --- |
| nonproductive blend | | | |
| NBR$^1$ Nipol 1042 | 57 | — | — |
| NBR$^2$ KNB 35 LM | 43 | — | — |
| HNBR$^3$ Zetpol 2011L | — | 100 | 100 |
| N330 carbon black | 5 | — | — |
| Ultrasil 7000 silica | 52 | — | — |
| N220 carbon black | — | 45 | 45 |
| HC-75 Clay | — | 20 | — |
| Plasthall TOTM | 10 | 10 | 7.5 |
| Plasthall 4141 | 10 | 10 | 7.5 |
| Zinc Oxide | 5 | 2.5 | 2.5 |
| Benzoic Acid | 0.5 | — | — |
| Stearic acid | — | 1 | 1 |
| Silane coupling agent | 4 | — | — |
| A-C 6A LDPE | 2.9 | 1 | 1 |
| Cl resin (72% on calcium silicate) | 7 | — | — |
| ZMTI antioxidant | 1.5 | 2 | 2 |
| Oxoflex DPA antioxidant | 0.5 | 2 | 2 |
| Paraffinic wax | 1 | 1 | 1 |
| Naugard 445 antioxidant | — | 2 | 2 |
| productive blend | | | |
| Sulfur | — | 0.3 | 0.75 |
| Sovchem ® MBS | 2.5 | — | — |
| Santocure ® CBS | — | 2.5 | 2.5 |
| Morpholine disulfide accelerator | 1 | 1 | 1 |

TABLE 1-continued

| Ingredient | Comparative Example | Ex. 1 | Ex. 2 |
|---|---|---|---|
| Tetramethylthiuram disulfide accelerator | 1.5 | — | — |
| Zinc dibutyl dithiocarbamate accelerator | — | 2 | 2 |
| N-cyclohexylthio)phthalimide retarder | 0.25 | — | — |
| Flow Sperse RD-50 | — | 10 | 10 |
| phr running Total: | 204.65 | 212.3 | 187.75 |

[1]Nipol 1042 available from Zeon Corp.
[2]KNB 35 LM available from Kumho Petrochemical
[3]Zetpol 2011L available from Zeon Corp.

The productive blends were then formed into 2 mm thick sheets and cured at temperature of about 302 deg F. for 30 minutes. Physical property testing was conducted on the cured example sheets or uncured examples, with values indicated in table 2 below. Mooney scorch was conducted on a Mooney rheometer (large rotor) and Rheometer tests conducted using a moving die rheometer. Tensile strength, elongation and Shore A Hardness were performed on cured example sheets according to ASTM D412. Die C Tear was performed on cured example sheets according to ASTM D624, and DIN Abrasion performed on cured example sheets according to ASTM D5963. The fluid immersion test was conducted by immersing the cured samples in IRM903 oil for 168 hours at a temperature of about 302 deg F. IRM903 oil is a testing oil for the ASTM D471 Standard Test Method to evaluate the comparative ability of rubber and rubber-like compositions to withstand the effect of liquids. The results of testing are provided in the following Table 2.

TABLE 2

| Test | Comparative Example | Ex. 1 | Ex. 2 |
|---|---|---|---|
| Mooney Scorch (30 mins / 414 F.) | | | |
| ML | 26.42 | 13.92 | 15.63 |
| t5 | | | 22.44 |
| Rheometer (60 mins / 302 F.) | | | |
| Min | 3.556 | 1.667 | 1.71 |
| Max | 26.87 | 18.17 | 24.4 |
| Tris1 | 0.75 | 5.55 | 3.06 |
| T90 | 18.88 | 21.86 | 15.55 |
| Rate | 2.94 | 2.26 | 3.75 |
| Amount | 23.32 | 16.5 | 22.69 |
| Original Physical Properties | | | |
| Tensile, psi | 2717 | 3159 | 4227 |
| Elongation, % | 598 | 647 | 573 |
| Mod 100, psi | 267 | 242 | 293 |
| Mod 300, psi | 974 | 658 | 1035 |
| Shore A Hardness | 67 | 66 | 65 |
| Die C Tear, lbf/inch | 253 | 277 | 278 |
| DIN Abrasion, non-rotating | 114 | 137 | 77 |
| Air Oven Age (168 hours / 302 F.) | | | |
| Tensile, psi | 791 | 2670 | 2836 |
| Elongation, % | 0 | 249 | 199 |
| Tensile retention, % | 29 | 85 | 67 |
| Elongation retention, % | 0 | 38 | 35 |
| Mod 100, psi | | 1367 | 1455 |
| Shore A Hardness | 96 | 89 | 87 |
| Fluid Immersion | | | |
| Tensile, psi | 1119 | 1475 | 3057 |
| Elongation, % | 295 | 572 | 686 |
| Tensile retention, % | 41 | 47 | 72 |
| Elongation retention, % | 49 | 88 | 120 |
| Mod 100, psi | 333 | 198 | 214 |
| Shore A Hardness | 67 | 59 | 60 |
| Vol Swell % | 8.06 | 10.2 | 9.74 |

As shown in the examples 1 and 2, use of a sulfur cured HNBR material based rubber as a cover material, provides a conveyor belt cover layer with excellent properties. For example, greater than 3000 psi in original tensile strength, greater than 2600 psi in oven aged tensile strength (after 168 hours @ 302 deg F.), fluid immersion volume % swelling of less than 11.0%, or even 10.2% or less, and oven aged Shore A hardness (after 168 hours @ 302 deg F.) of greater than 85.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE SIGNS (PART OF THE DESCRIPTION)

1 Conveyor belt
2 Conveyor belt
3 Conveyor belt
4 Carry cover layer
6 Reinforcement layer
8 Pulley cover layer
10 Reinforcement rubber matrix
12 Reinforcement ply
14 Reinforcement ply
16 Reinforcement ply
18 Steel cables
20 Thermal insulation layer
22 Basalt fiber layer

What is claimed is:

1. A conveyor belt comprising a reinforcement layer, a carry cover layer above the reinforcement layer, and a pulley cover layer beneath the reinforcement layer, wherein the carry cover layer comprises at least one hydrogenated nitrile butadiene rubber (HNBR) material, and wherein the carry cover layer has an original tensile strength value of greater than 3000 psi.

2. The conveyor belt as claimed in claim 1, wherein the carry cover layer is from 4 mm to 6 mm thick.

3. The conveyor belt as claimed in claim 2, wherein the carry cover layer is from 4 mm to 5 mm thick.

4. The conveyor belt as claimed in claim 1, wherein the reinforcement layer comprises a reinforcement rubber matrix.

5. The conveyor belt as claimed in claim 4, wherein the reinforcement rubber matrix comprises a nitrile rubber (NBR).

6. The conveyor belt as claimed in claim 5, wherein the reinforcement rubber matrix further comprises a natural rubber (NR), and wherein the nitrile rubber (NBR) and natural rubber are blended in an NBR:NR weight ratio of from 3:1 to 9:1.

7. The conveyor belt as claimed in claim 6, wherein the nitrile rubber (NBR) and natural rubber are blended in an NBR:NR weight ratio of from 5:1 to 9:1.

8. The conveyor belt as claimed in claim 1, wherein the reinforcement layer comprises a plurality of reinforcement plies embedded in a reinforcement rubber matrix.

9. The conveyor belt as claimed in claim 8, wherein the reinforcement layer comprises three reinforcement plies embedded in the reinforcement rubber matrix.

10. The conveyor belt as claimed in claim 1, wherein the reinforcement layer comprises a plurality of steel cables embedded in a reinforcement rubber matrix.

11. The conveyor belt as claimed in claim 1, wherein the carry cover layer has an oven aged (after 168 hours @ 302 deg F.) tensile strength value of greater than 2600 psi.

12. The conveyor belt as claimed in claim 1, wherein the carry cover layer has a fluid immersion volume % swelling of less than 11.0% after immersion IRM903 oil for 168 hours at a temperature of 302 deg F.

13. The conveyor belt as claimed in claim 1, wherein the carry cover layer has an oven aged (after 168 hours @ 302 deg F.) Shore A hardness of less than 90.

14. A conveyor belt comprising a reinforcement layer, a carry cover layer above the reinforcement layer, and a pulley cover layer beneath the reinforcement layer, wherein the carry cover layer comprises a hydrogenated nitrile butadiene rubber (HNBR) material having a percentage of hydrogenation of from 92% to 95%, wherein the reinforcement layer comprises nitrile rubber (NBR) blended with natural rubber and a plurality of reinforcement plies embedded in the nitrile rubber (NBR) blended with natural rubber, and wherein the conveyor belt transports materials having a temperature in excess of 150° C.

15. The conveyor belt as claimed in claim 14, wherein the nitrile rubber (NBR) and natural rubber are blended in an NBR:NR weight ratio of from 3:1 to 9:1.

16. The conveyor belt as claimed in claim 15, wherein the nitrile rubber (NBR) and natural rubber are blended in an NBR:NR weight ratio of from 5:1 to 9:1.

17. The conveyor belt as claimed in claim 14, wherein the carry cover layer has an original tensile strength value of greater than 3000 psi.

18. The conveyor belt as claimed in claim 14, wherein the carry cover layer has an oven aged (after 168 hours @ 302 deg F.) tensile strength value of greater than 2600 psi.

19. The conveyor belt as claimed in claim 14, wherein the carry cover layer has a fluid immersion volume % swelling of less than 11.0% after immersion IRM903 oil for 168 hours at a temperature of 302 deg F. and an oven aged (after 168 hours @ 302 deg F.) Shore A hardness of less than 90.

* * * * *